United States Patent [19]
Suddeth

[11] Patent Number: 5,606,820
[45] Date of Patent: Mar. 4, 1997

[54] TANGLE-FREE FISHING LURE STORAGE CONTAINER

[76] Inventor: Melvin E. Suddeth, 798 Griffin Mill Rd., Pickens, S.C. 29671

[21] Appl. No.: 316,847

[22] Filed: Oct. 3, 1994

[51] Int. Cl.$^6$ ............................................. A01K 97/06
[52] U.S. Cl. ................................. 43/57.1; 206/315.11
[58] Field of Search ................. 206/315.11; 43/57.1, 43/57.2, 54.1

[56] References Cited

U.S. PATENT DOCUMENTS

| | | | |
|---|---|---|---|
| 2,220,817 | 11/1940 | Holmes | 43/57.1 |
| 2,364,807 | 12/1944 | Nelson, Jr. | 43/32 |
| 2,595,051 | 4/1952 | Bryant | 43/57.5 |
| 2,608,459 | 8/1952 | Malmquist | 43/57.1 |
| 2,723,484 | 11/1955 | Nelson, Jr. | 43/54.5 |
| 2,841,917 | 7/1958 | Haskell | 43/54.5 |
| 2,849,829 | 9/1958 | Fisher | 43/57.2 |
| 2,956,365 | 10/1960 | Smith | 43/57.1 |
| 3,310,905 | 3/1967 | Davis | 43/57.1 |
| 3,948,579 | 4/1976 | Schirmer | 43/57.1 |
| 4,240,222 | 12/1980 | Covington | 43/57.5 |
| 4,729,474 | 3/1988 | Lanius | 43/54.1 |
| 4,848,585 | 7/1989 | Snyder | 206/315.11 |
| 5,228,232 | 7/1993 | Miles | 43/54.1 |
| 5,392,557 | 2/1995 | Harmon | 43/57.1 |
| 5,475,943 | 12/1995 | Hodges | 43/57.1 |

FOREIGN PATENT DOCUMENTS 1452214  9/1966  France ..................... 43/57.1

Primary Examiner—Joseph J. Hail, III
Assistant Examiner—James Miner
Attorney, Agent, or Firm—Cort Flint

[57] ABSTRACT

A storage container for storing fishing lures having treble hooks carried by lure bodies in a tangle-free manner includes a plurality of lure compartments, each having first and second lure storage panels. A plurality of lure retention slots are formed in the lure storage panels having a slot entrance which receives a shank of the treble hooks of the fishing lures. The first and second panels are carried in each lure compartment and a hook space is formed below the panels and a lure body space is formed above the panels so that the treble hooks are completely enclosed and separated from the treble hooks of the other fishing lures as well as from the bodies of the fishing lures. The first and second lure storage panels are carried in each compartment about a pivot so that the slot entrances may be pivoted upwardly for easy insertion and removal of fishing lures. The first and second lure storage panels in each compartment are disposed generally coplanar so that all of the fishing lures are fully visible upon opening of the lure compartments. In this manner, a large number of fishing lures may be stored in a tangle-free manner and additional lure compartments may be added to a base unit to carry as many fishing lures as desired.

25 Claims, 3 Drawing Sheets

TANGLE-FREE FISHING LURE STORAGE CONTAINER

BACKGROUND OF THE INVENTION

This invention relates to a storage container for fishing lures, and more particularly to a container in which a large number of fishing lures with treble hooks may be stored in a tangle-free manner.

The popularity of sport and tournament fishing has increased rapidly over the past two decades. In particular, fishing for bass and other sport fish competitively in fishing tournaments and other events, as well as for sport, has lead to a corresponding increase in the interest of fishing baits. It is common practice to use a large number of artificial fishing lures or plugs with treble hooks in sport and tournament fishing. With the popularity of this fishing, the number of fishing lures which need to be used and carried by the fisherman presents a problem to which considerable attention need be given. Not only are the treble hooks of fishing lures easily entangled with one another, but it is easy for the sharp points of the treble hooks to pierce into the skin during handling. Accordingly, the provision of a storage container for containing and managing a very large number of fishing lures with treble hooks in a generally tangle-free manner is one to which considerable attention need be given.

Heretofore, containers have been provided for fishing lures having treble hooks. However, such containers are typically suitable for only containing a small number of fishing lures. For example, U.S. Pat. No. 2,364,807 discloses a container having a slotted compartment for containing fishing lures with treble hooks. Not only is the number of lures that may be contained limited, but the opening and closing of the container requires the sliding of moveable panels in and out of grooves. U.S. Pat. Nos. 2,723,484 and 2,841,917 disclose individual containers which utilize various arrangements of slots. U.S. Pat. No. 2,595,051 discloses a fishing lure holder having two rows of slotted members for supporting fishing lures; however, the fishing lures are not retained in the slots and may easily dislodge from the slots and become entangled during movement of the holder. U.S. Pat. No. 4,240,222 discloses a tackle box consisting of a stack of upstanding rectangular housing units. The units may be hinged together by pins which are readily removable so that the units can be added or deleted as desired by fishermen. While the above various fishing lure holders and containers, and tackle boxes, may be suitable for their intended purposes, they do not provide a fishing lure storage container which is satisfactory for containing a large number of fishing lures with treble hooks in a tangle-free manner.

Accordingly, an object of the invention is to provide a storage container for containing a large number of fishing lures in a tangle-free manner.

Another object of the present invention is to provide a fishing lure storage container for containing fishing lures having treble hooks in which the lures may be stored and retrieved easily without the need to manually handle the hooks.

Another object of the present invention is to provide a fishing lure storage container for maintaining a large number of fishing lures with treble hooks wherein the fishing lures are retained in a tangle-free manner inside the container and may be easily placed and removed conveniently during fishing.

Another object of the invention is to provide a fishing lure storage container for use in sport and tournament fishing in which a large number of fishing lures may be stored in a tangle-free manner for quick and easy use, and wherein storage compartments for the tangle-free storage of the fishing lures may be added or deleted from a base unit as desired by the fisherman.

SUMMARY OF THE INVENTION

The above objectives are accomplished according to the present invention by providing a fishing lure storage container for storing a large number of fishing lures in a tangle-free manner. The storage container includes a first lure compartment and a second lure compartment disposed in side-by-side arrangement. Lure storage panels are disposed in the first and second storage compartments, and comprise at least a first lure storage panel and a second lure storage panel rotatable about a common pivot. The first and second lure storage panels each comprise a plurality of elongated lure retention slots formed along a length of the panels for receiving a shank of the treble hooks of the fishing lure. The lure retention slots including slot entrances formed along a free edge of each of the first and second panels. The slot entrances include a closed end opposite the slot entrance. The lure storage panels have a closed position in the lure compartment in which the fishing lures are prevented from being removed from the lure retention slots through the slot entrances. The storage panels have an open position in which the lures may be removed from the retention slots by the slot entrances. A hinge connects the first and second lure compartments together to form a base unit so that the first and second compartments may be opened approximately one hundred eighty degrees, and the first and second lure storage panels are open for full visibility. The first and second lure storage panels of the lure compartments are disposed generally co-planar in the closed position to define a lure space on a first space of the storage panels and a hook space on a second, opposite side of the panels so that the treble hooks are completely isolated from the lure bodies. A ledge forms around at least a part of an interior periphery of the hook space and supports the free edge of the first and second panels in the closed position. The lure spaces of the first and second compartments are open and face each other when the first and second compartments are in the side-by-side position. The hook spaces are completely enclosed and separated from one another. The common pivot of the first and second hinge panels include, a panel hinge formed between the first and second panels so that the panels pivot relative to each other, and a hinge rod joining the first and second panels together along the pivot. The slot entrances include a neck having a widened mouth which narrows to a width of the lure retention slot to facilitate placement of the shanks of the treble hooks in the retention slots.

In an advantageous embodiment, the first and second lure compartments fit together in a side-by-side configuration to form a base unit. The base unit includes a first bottom wall of the first compartment and a second bottom wall of the second compartment. A first hinge part is carried by the first and second bottom walls of the first and second compartments of the base unit for forming a detachable hinge with axillary compartments to be added to the base unit. At least one axillary compartment is provided which includes the first and second lure retention panels. An axillary compartment has a bottom wall with a second hinge part and mates with the first hinge part of the base unit to form a detachable hinge by which the axillary compartment is carried with the base unit.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 5 is a sectional view taken along line 5—5 of FIG. 1.

DESCRIPTION OF A PREFERRED EMBODIMENT

Figure 1:
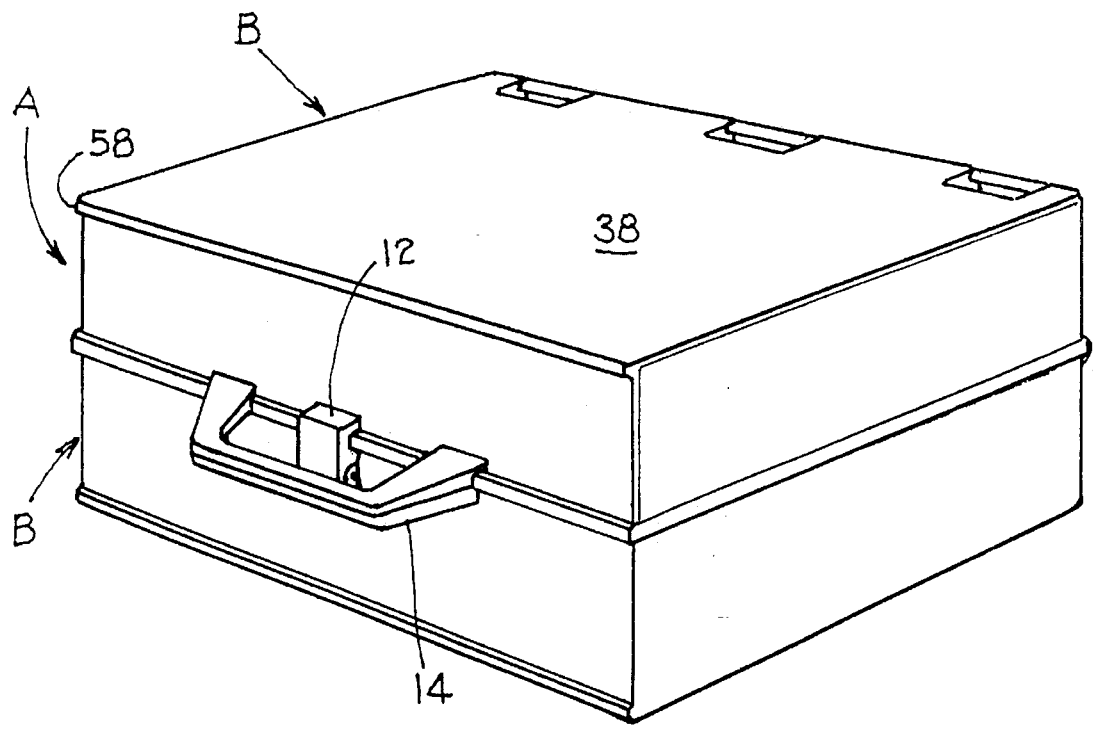
FIG. 1 is a perspective view of a fishing lure storage container for storing fishing lures having treble hooks in a tangle-free manner constructed according to the invention.

Referring now in more detail to the drawings, FIG. 1 illustrates a tangle-free fishing lure storage container, designated generally as A, which includes a plurality of fishing lure storage compartments B affixed together by any suitable means such as a releasable hinge designated generally as 10. There is a lock 12 which locks compartments B together and a handle 14 for carrying the fishing lure container when latched which includes a handle part 14a, 14b molded into each compartment. While fishing lure compartments B are illustrated in a rectangular configuration, other configurations may also be possible. Preferably, the fishing lure compartments are molded from a suitable plastic material to provide advantages which will be apparent from the further discussion. However, it is to be understood, of course, that other suitable materials such as aluminum may also be utilized.

Figure 2:
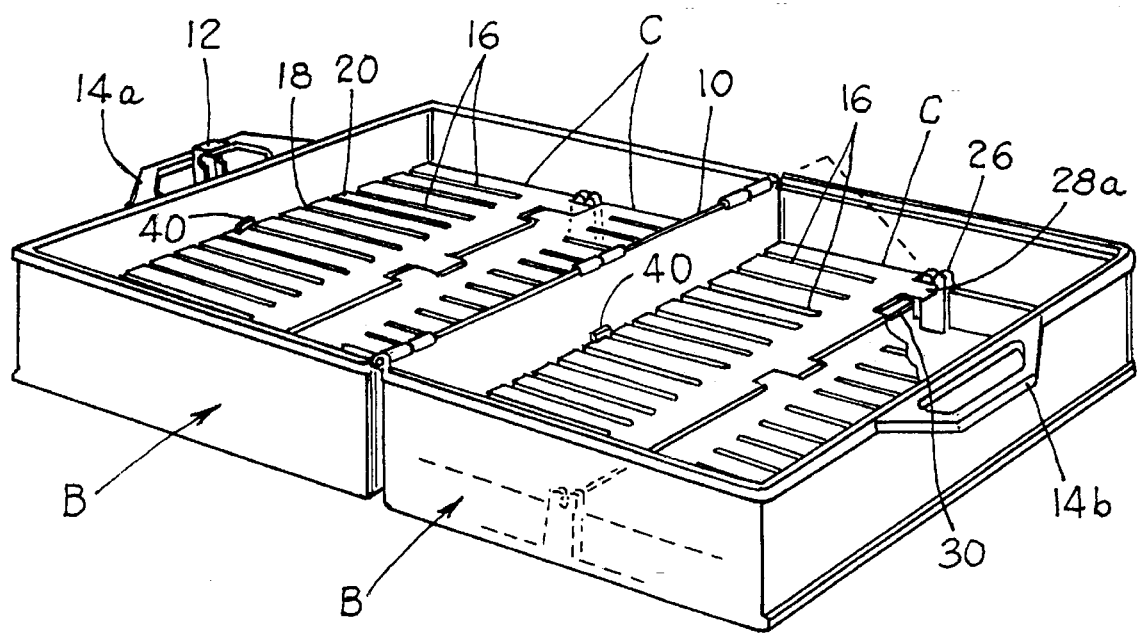
FIG. 2 is a perspective view of the lure storage container of FIG. 1 with the unit open illustrating the storage panels constructed according to the invention.
Figure 3:
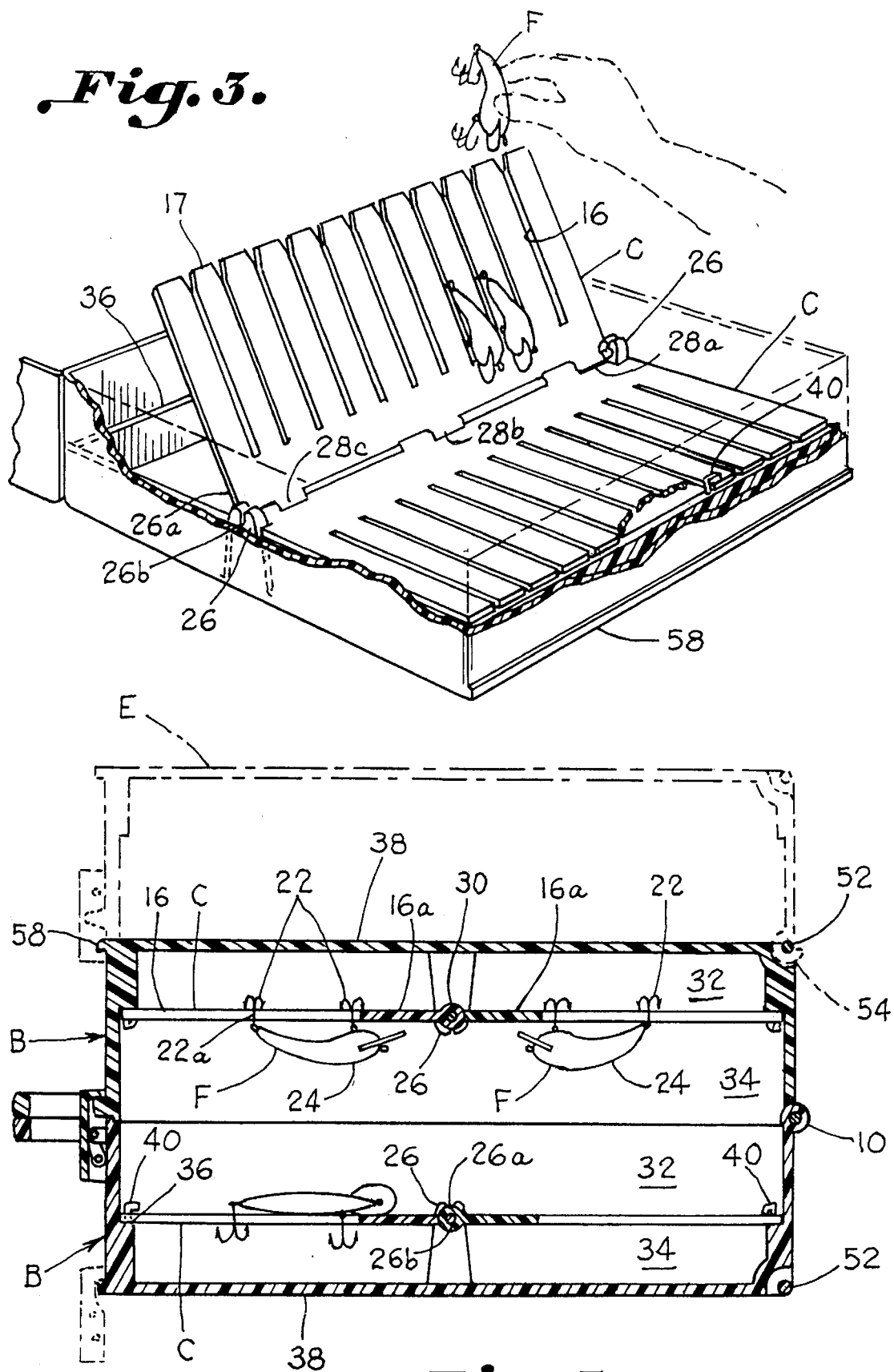
FIG. 3 is a perspective view with parts cut away of a compartment having plural slotted fishing storage panels for tangle-free storage of fishing lures according to the invention.

Referring now in more detail to individual fishing lure storage compartments B, each compartment includes a plurality of lure storage panels C which retain a large number of fishing lures in a tangle-free manner. Each lure storage panel includes a series of elongated slots 16 having a slot entrance 18 along a free edge 20 of panel C. In the illustrated embodiment, lure storage panels C are rectangular and are molded from a suitable plastic material, although they may be casted or machined from a suitable metal, such as aluminum. Advantageously, in each storage compartment B, as can best be seen in FIGS. 3 and 5, fishing lures F are retained by the lure retention slot 16. Treble hooks 22 of the fishing lure are retained on a back side 16a of panels C. For this purpose, a shank 22a of treble hooks 22 is received through the slot with the body 24 of the fishing lure disposed on a front side 16b of the lure storage panels. Two adjacent panels C are preferably joined together by a releasable hinge which includes a pair of molded bosses 26 formed on opposing sides of each compartment B. There are a plurality of hinge tabs 28a, 28b, 28c carried on each panel C along a pivotal edge. There is a hinge rod 30 extending through the hinge tabs of the hinged panels which snaps into the bosses 26 (FIG. 2). For this purpose, a crevice or neck 30a leads to a hinge opening 30b in each boss 30 (FIG. 5).

As can best be seen in FIG. 5, lure storage panel storage C divide each compartment B into a lure space 32 and a hook space 34. Hook space 34 is completely enclosed so that there is little, if any, chance that the barbs of the hooks will engage a person or any other object accidentally. A ledge 36 supports free edge 20 of the lure storage panels while the opposing edge of the panels are supported by hinge rod 30 and bosses 26. The panels are thus generally co-planar, and parallel to the exterior walls 38 of compartments B. Ledges 36 may go around all four sides of the rectangular compartments or may simply extend across the sides of the compartment adjacent free edges 20 of the panels. Hinge rod 30 snaps in and out easily of bosses 26 through crevice 26a. For the purpose of retaining lure storage panel C in a closed position (FIG. 5), a latch 40 may be provided having a "L" shaped head so that turned in one position the "L" is aligned with a groove 16 so that panel C may be lifted to a raised position (FIG. 3) for inserting and removing a fishing lure. The panel may be raised when the leg of the "L" is aligned with the groove by grasping a fishing lure and pulling the panel upward. When panel C is folded down against ledge 36, latch 40 may be turned cross-wise so that the "L" of the latch extends across the slot, and engages opposing fingers 17 defined between adjacent slots. Of course, other suitable locks may also be used such as a push/twist lock having a knob which may used to raise the panel. Entrance opening 18 leading to each slot 18 preferably includes a neck so that the opening is slightly wider than the grooves and tapers into the parallel sides of the grooves.

Thus, it can be seen that an advantageous construction can be had for storage panels for retaining a large number of fishing lures in a tangle-free manner wherein the fishing lures may be easily inserted and removed from lure retention slots. Upwards of sixteen to twenty-four retention slots may be made in a rectangular panel of a compartment corresponding to the size of a conventional storage tackle box. The panels may be unlatched and raised to the removable position shown in FIG. 3 whereupon fishing lure may be easily removed. The fishing lures are displayed across the panels in a highly visible manner so that the desired fishing lure may be easily detected and removed by the fisherman. While the panels are locked in place, the hooks are enclosed in hook space 34 so that they are entirely safe.

Figure 4:
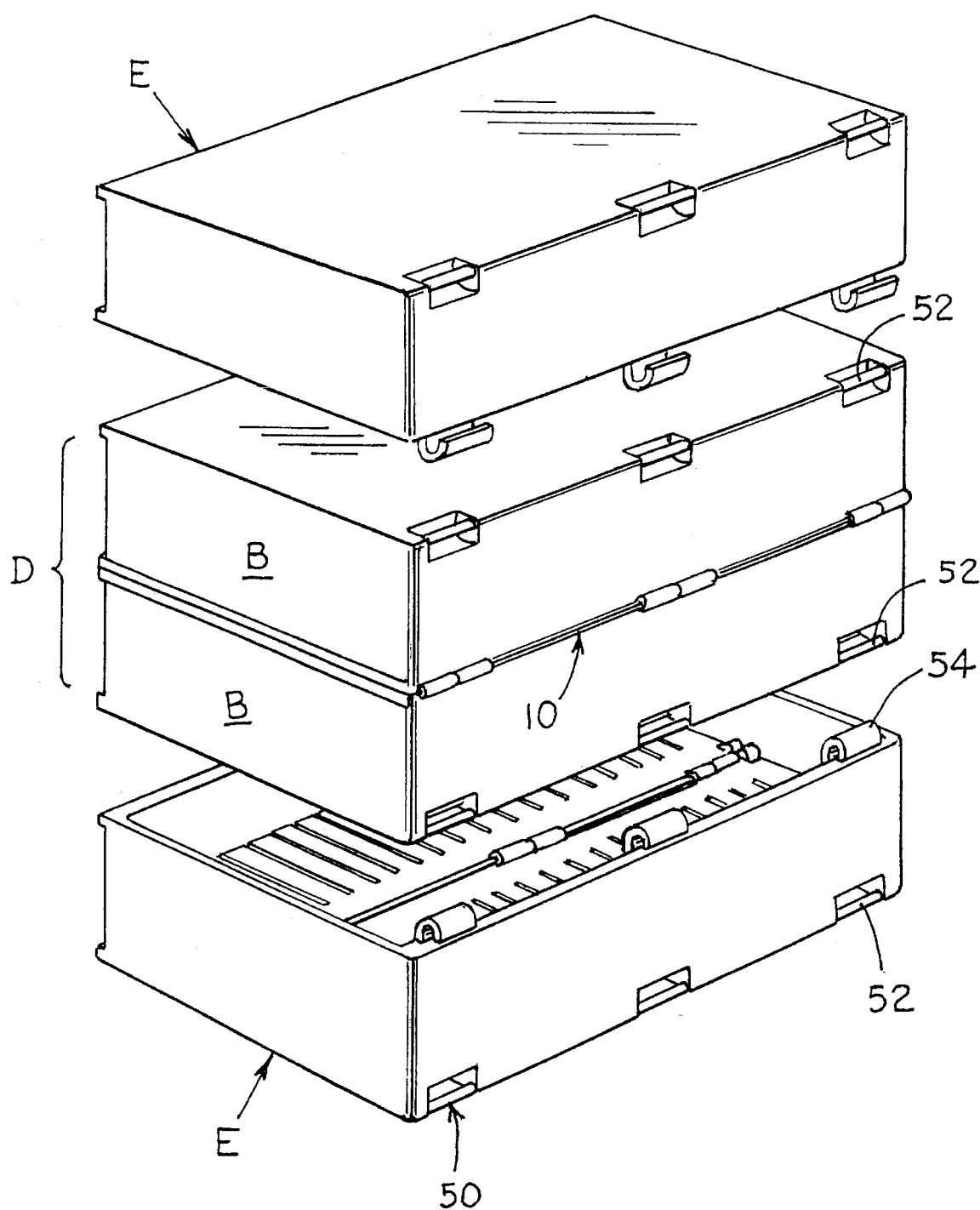
FIG. 4 is a perspective view illustrating the addition of additional fishing lure storage compartments constructed according to the invention to a base unit.

Referring now to FIG. 4, an embodiment of the invention is illustrated wherein auxiliary compartments E may be easily added to base unit D so that additional and even larger numbers of fishing lures may be stored in the tangle-free manner. Auxiliary storage compartments E are identical to main storage compartments B except that a detachable hinge, illustrated generally at 50 is provided having a first hinge part 52 recessed within one edge of compartment E and a second hinge part 54 molded into an opposing edge of compartment E. Base unit D also includes first hinge part 52 formed in an outer edge which receives second hinge part 54 of axillary units E so that they may be hinged with the base unit, as can best be seen in dotted lines in FIG. 5. A second latch 56 is provided on the opposite side wall of compartment E which cooperates with a rib 58 formed along a top edge of each compartment B (and E) to secure the axillary compartment to the base unit. Alternately, latch 56 may be provided to latch additional axillary compartments to another axillary compartment. In this manner, axillary compartments can be added to the base unit to accommodate as many fishing lures as desired by the fisherman- In addition, it is also possible for the fisherman to reduce the overall size of the storage container if he wishes to delete fishing lures by removing axillary storage containers and only utilizing the base unit. For example, if during travel it is desired not to carry the entire assembly or number of fishing lures, the axillary units may be detached and left.

While a preferred embodiment of the invention has been described using specific terms, such description is for illustrative purposes only, and it is to be understood that changes and variations may be made without departing from the spirit or scope of the following claims.

What is claimed is:

1. A fishing lure storage container for storing a large number of fishing lures in a tangle-free manner comprising:

a first lure storage compartment;

a second lure storage compartment disposed in side-by-side arrangement connected with said first lure compartment;

a plurality of lure storage panels disposed in said first and second storage compartments, each of said lure storage panels comprising a pivotal edge;

said plurality of lure storage panels comprising at least a first lure storage panel and a second lure storage panel rotatable about at least one pivot, said at least one pivot being disposed proximate a medial portion of said first and second storage compartments, and said at least one pivot disposed between adjacent pivotal edges of said lure storage panels;

said first and second lure storage panels each comprising a plurality of elongated lure retention slots formed along a length of said panels for receiving a shank of said treble hooks of said fishing lure;

said lure retention slots including slot entrances formed along a free edge of each of said first and second panels opposite said pivotal edge of each of said lure storage panels, and said slot entrances including a closed end opposite said slot entrance; and said lure storage panels in each compartment having a closed position in said lure compartment by which said fishing lures are prevented from being removed from said lure retention slots through said slot entrances and from being entangled with one another, and said line storage panels having an open position in which said lures may be removed from said retention slots via said slot entrances.

2. The container of claim 1 including a hinge for connecting said first and second lure compartments together to form a base unit so that said first and second compartments may be opened approximately one hundred eighty degrees so that said first and second lure storage panels in each said compartment are open for full visibility.

3. The container of claim 2 including a latch for latching said hinged first and second compartments together in said side-by-side arrangement.

4. The container of claim 1 wherein said first and second lure storage panels of said first and second lure compartments are disposed generally co-planar in said closed position to define a lure space on a first space of said storage panels and a hook space on a second, opposite side of said panels so that said treble hooks are completely isolated from said lure bodies.

5. The container of claim 4 including a lock for locking said first and second panels in said closed position.

6. The container of claim 4 comprising a ledge formed around at least a part of an interior periphery of said hook space which supports said free edge of said first and second panels in said closed position.

7. The container of claim 4 wherein said lure spaces of said first and second compartments are open and face each other when said first and second compartments are in said side-by-side position, and said hook spaces are completely enclosed and separated from one another.

8. The container of claim 1 wherein at lease one pivot includes a common pivot of said first and second hinge panels which includes, a panel hinge formed between said first and second panels so that said panels pivot relative to each other, and a hinge rod joining said first and second panels together along said pivot.

9. The container of claim 8 wherein said pivot of said first and second panels includes a snap hinge whereby said hinge rod may be snapped in and out of said compartment.

10. The container of claim 1 wherein said slot entrances include a neck having a widened mouth which narrows to a width of said lure retention slot to facilitate placement of said shanks of said treble hooks in said retention slots.

11. The container of claim 1 wherein said first and second lure compartments fit together in a side-by-side configuration to form a base unit, said base unit including a first bottom wall of said first compartment and a second bottom wall of said second compartment, and a first hinge part carried by said first and second bottom walls of said first and second compartments of said base unit for forming a detachable hinge with axillary compartments to be added to said base unit.

12. The container of claim 11 including at least one axillary compartment which includes said first and second lure retention panels, and said axillary compartment having a bottom wall with a second hinge part that mates with said first hinge part of said base unit to form a detachable hinge by which said axillary compartment is carried with said base unit.

13. A fishing lure storage container for containing a large number of fishing lures in a tangle-free manner comprising:

at least one fishing lure compartment;

a plurality of lure storage panels disposed in said storage compartment, each of said lure storage panels comprising a pivotal edge;

said plurality of lure storage panels comprising at least a first lure storage panel and a second lure storage panel rotatable about at least one pivot, said at least one pivot being disposed proximate a medial portion of said storage compartment, and said at least one pivot disposed between adjacent pivotal edges of said lure storage panels;

said first and second lure storage panels each comprising a plurality of elongated lure retention slots formed in said panels for receiving a shank of said treble hooks of said fishing lure;

said lure retention slots including slot entrances formed along a free edge of each of said first and second panels opposite said pivotal edge of each of said lure storage panels, and said slot entrances including a closed end opposite said slot entrance; and said lure storage panels in each compartment having a closed position in said lure compartment by which said fishing lures are prevented from being removed from said lure retention slots through said slot entrances and from being entangled with one another, and said line storage panels having an open position in which said lures may be removed from said retention slots.

14. The container of claim 13 wherein said first and second lure storage panels of said lure compartment are disposed generally co-planar in said closed position to define a lure space on a first space of said storage panels and a hook space on a second, opposite side of said panels so that said treble hooks are completely isolated from said lure bodies.

15. The container of claim 14 including a lock for locking said first and second panels in said closed position.

16. The container of claim 14 comprising a ledge formed around at least a part of an interior periphery of said hook space which supports said free edge of said first and second panels in said closed position.

17. The container of claim 14 wherein said lure space of said compartment is open and said hook space is completely enclosed and separated from said lure space.

18. The container of claim 13 wherein at least one pivot of said first and second lure storage panels include, a common panel hinge formed between said first and second panels so that said panels pivot relative to each other, said panel hinge having a hinge rod joining said first and second panels together along said pivot.

19. The container of claim 18 wherein said pivot of said first and second panels includes a snap hinge whereby said hinge rod may be snapped in and out of said compartment.

20. The container of claim 13 wherein said slot entrances include a neck having a widened mouth which narrows to a width of said lure retention box to facilitate placement of said shanks of said treble hooks in said retention slots.

21. The container of claim 13 wherein said lure storage panels are generally co-planar and generally coextend across said lure compartment in said closed position.

22. A fishing lure storage container for containing a large number of fishing lures in a tangle-free manner comprising:

a first lure compartment;

a second lure compartment disposed in side-by-side arrangement with said first compartment;

at least first and second pivotal lure storage panels disposed in each of said first and second storage compartments;

said lure storage panels including a plurality of lure retention slots for receiving a shank of said treble hooks of said fishing lure;

said lure retention slots including a slot entrance formed along free edges of said panels, and said retention slots being closed opposite said slot entrances; and a pivot between said first and second panels which include a panel hinge formed between said first and second panels so that said panels pivot relative to each other, and a hinge rod joining said first and second panels together along said pivot axis; and said lure storage panels having a closed position in said lure compartments by which said finishing lures are prevented from being removed from said lure retention slots through said slot entrances, and said storage panels having an open position in which said fishing lures may be removed from said retention slots.

23. The container of claim 22 wherein said first and second lure compartments fit together in a side-by-side configuration to form a base unit, said base unit including a first bottom wall of said first compartment and a second bottom wall of said second compartment, and a first hinge part carried by said first and second bottom walls of said first and second compartments of said base unit for forming a detachable hinge with axillary compartments to be added to said base unit.

24. The container of claim 23 including at least one axillary compartment which includes said first and second lure retention panels, and said axillary compartment having a bottom wall with a second hinge part that mates with said first hinge part of said base unit to form a detachable hinge by which said axillary compartment is carried with said base unit.

25. The container of claim 22 wherein said first and second lure storage panels of said first and second lure compartments are disposed generally co-planar in said closed position to define a lure space on a first space of said storage panels and a hook space on a second, opposite side of said panels so that said treble hooks are completely isolated from said lure bodies.

\* \* \* \* \*